US010244006B2

(12) United States Patent
Lucano et al.

(10) Patent No.: US 10,244,006 B2
(45) Date of Patent: Mar. 26, 2019

(54) SESSION INITIATION PROTOCOL EXTENSION FOR DIGITAL MOBILE RADIO NETWORKS MATCHING PRIVATE OR PROFESSIONAL MOBILE RADIO FEATURES

(71) Applicant: SELEX ES S.P.A., Rome (IT)

(72) Inventors: Daniele Lucano, Rome (IT); Claudia Olivieri, Rome (IT); Marco Pizzorno, Rome (IT)

(73) Assignee: SELEX ES S.P.A., Rome (IT)

( * ) Notice: Subject to any disclaimer, the term of this patent is extended or adjusted under 35 U.S.C. 154(b) by 375 days.

(21) Appl. No.: 14/895,169

(22) PCT Filed: Jun. 17, 2014

(86) PCT No.: PCT/IB2014/062305
§ 371 (c)(1),
(2) Date: Dec. 1, 2015

(87) PCT Pub. No.: WO2014/203168
PCT Pub. Date: Dec. 24, 2014

(65) Prior Publication Data
US 2016/0127421 A1 May 5, 2016

(30) Foreign Application Priority Data
Jun. 17, 2013 (EP) .................................... 13425084

(51) Int. Cl.
*G06F 15/16* (2006.01)
*H04L 29/06* (2006.01)
*H04W 4/10* (2009.01)

(52) U.S. Cl.
CPC .......... *H04L 65/105* (2013.01); *H04L 65/102* (2013.01); *H04L 65/1006* (2013.01);
(Continued)

(58) Field of Classification Search
USPC ....................................................... 709/227
See application file for complete search history.

(56) References Cited

U.S. PATENT DOCUMENTS 8,280,422 B2 * 10/2012 Forsten ................... H04W 4/10
455/518
8,565,760 B2 * 10/2013 Vanswol ................. H04W 8/04
380/248

(Continued)

FOREIGN PATENT DOCUMENTS

WO   WO 2007/088247   8/2007

OTHER PUBLICATIONS

International Search Report and Written Opinion from International Application No. PCT/IB2014/062305 dated Oct. 23, 2014.

(Continued)

*Primary Examiner* — Alicia Baturay
(74) *Attorney, Agent, or Firm* — Dorsey & Whitney LLP

(57) ABSTRACT

A system comprising:
a SIP Proxy Server, and
DMR Gateway(s) to interface the SIP Proxy Server with DMR Network(s) matching Private/professional Mobile Radio (PMR) features;
each DMR Gateway is univocally assigned with a SIP ID and is designed to:
interpret messages from the SIP Proxy Server to manage DMR signalling/data/voice features toward DMR Terminals, and
initiate DMR features on account of DMR Terminals operating under it and make requests for DMR signalling/data/voice features toward destinations belonging to another Network;
each DMR Gateway is designed to:
transcode an over-the-air, manufacturer-specific DMR Terminal registration into a SIP REGISTER message to
(Continued)

result in the SIP Proxy server perceiving and managing the DMR Terminal as a SIP User Agent;
the SIP Proxy Server is designed to manage:
DMR signalling features, including voice call set-up, and DMR data features using the SIP MESSAGE method, and/or
DMR signalling/data/voice group features.

10 Claims, 9 Drawing Sheets

(52) U.S. Cl.
CPC ........ *H04L 65/1056* (2013.01); *H04L 65/608* (2013.01); *H04W 4/10* (2013.01)

(56) References Cited

U.S. PATENT DOCUMENTS

| | | | |
|---|---|---|---|
| 8,855,054 B2* | 10/2014 | Otamendi | H04L 12/66 370/328 |
| 8,929,938 B2* | 1/2015 | Koren | H04W 4/10 379/202.01 |
| 9,467,827 B2* | 10/2016 | Maria | H04W 4/14 |
| 2013/0029714 A1 | 1/2013 | Koren et al. | |

OTHER PUBLICATIONS

International Preliminary Report on Patentability from International Application No. PCT/IB2014/062305 dated Jul. 7, 2015.

* cited by examiner

| Tier II and Tier III feature | Match with standard SIP | Standard SIP methods involved | Comment |
|---|---|---|---|
| Registration | yes | REGISTER | |
| Radio-telephone Call | yes | INVITE, ACK, CANCEL, BYE | standard SIP call |
| Group Call | partial | INVITE, ACK, CANCEL, BYE | need to manage group service and PTT status |
| Emergency Call | partial | INVITE, ACK, CANCEL, BYE | need to manage group feature and PTT status; use header Priority: emergency |
| OACSU Individual Call | partial | INVITE, ACK, CANCEL, BYE | need to convey signaling before setting up the call, and PTT status |
| Ambience Listening (Radio Monitor for Tier II) | partial | INVITE, ACK, CANCEL, BYE | need to convey signaling before setting up the call; need to manage PTT status |
| MS (Mobile Station) Radio Check | yes | MESSAGE | need to manage feature-specific information |
| Text Messaging Individual | yes | MESSAGE | |
| Text Messaging Group | yes | MESSAGE | need to manage group feature |
| Location (GPS position) | yes | MESSAGE | need to manage feature-specific information |
| End-to-End Encrypted Voice Call | partial | INVITE, ACK, CANCEL, BYE | need to manage feature-specific information; applies to all kinds of Voice Calls |
| Tier II only feature | Match with standard SIP | Standard SIP methods involved | Comment |
| PATCS Individual Call | partial | INVITE, ACK, CANCEL, BYE | need to manage PTT status |
| All Call (one-way call to All Unit ID) | partial | INVITE, ACK, CANCEL, BYE | need to manage group feature and PTT status |
| Call Alert | yes | MESSAGE | need to manage feature-specific information |
| Radio Enable | yes | MESSAGE | need to manage feature-specific information |
| Radio Disable | yes | MESSAGE | need to manage feature-specific information |
| Emergency Alarm | partial | MESSAGE | need to manage feature-specific information; need to manage group feature |
| Tier III only feature | Match with standard SIP | Standard SIP methods involved | Comment |
| Authentication | partial | REGISTER MESSAGE | need to manage feature-specific information for RC4 challenge |
| FOACSU Individual Call | partial | INVITE, ACK, CANCEL, BYE | need to convey signaling before setting up the call |
| Broadcast Call | partial | INVITE, ACK, CANCEL, BYE | need to manage group feature, broadcast property and PTT status |
| Radio Stun | yes | MESSAGE | need to manage feature-specific information |
| Radio Revive | yes | MESSAGE | need to manage feature-specific information |
| Radio Kill | yes | MESSAGE | need to manage feature-specific information |
| Status Call | yes | MESSAGE | need to manage feature-specific information |

FIG. 1

| Entity name | DMR ID | IP address | Comment |
|---|---|---|---|
| Bob | 304 | none | Bob is a radio user (MS) operating under DMR Gateway1 |
| Charlie | 305 | none | Charlie is a radio user (MS) operating under DMR Gateway2 |
| Dave | 306 | none | Dave is a radio user (MS) operating under DMR Gateway3 |
| Radio Group | 9999 | none | Radio users operating under DMR Gateways 1,2 and 3 |
| DMR Gateway1 | 1004 | 192.168.63.14 | DMR Gateway1 |
| DMR Gateway2 | 1005 | 192.168.63.15 | DMR Gateway2 |
| DMR Gateway3 | 1006 | 192.168.63.16 | DMR Gateway3 |
| Alice | 10001 | 192.168.63.11 | Alice is a Dispatcher |
| SIP Server | none | 192.168.63.1 | It is an AISIP Server |

FIG. 5

| Feature | Tier II and Tier III feature | Tier II only feature | Tier III only feature |
|---|---|---|---|
| MS Radio Check | yes | - | - |
| Text Messaging Individual | yes | - | - |
| Text Messaging Group | yes | - | - |
| Location (GPS position) | yes | - | - |
| Call Alert | - | yes | - |
| Radio Enable | - | yes | - |
| Radio Disable | - | yes | - |
| Emergency Alarm | - | yes | - |
| Radio Stun | - | - | yes |
| Radio Revive | - | - | yes |
| Radio Kill | - | - | yes |
| Status Call | - | - | yes |

FIG. 6

| Feature / Sub-feature | Tier II and Tier III feature | Tier II only feature | Tier III only feature |
|---|---|---|---|
| OACSU Individual Call | yes | - | - |
| Ambiance Listening | yes | - | - |
| FOACSU Individual Call | - | - | yes |
| System Busy | - | - | yes |
| Party Not Available | - | - | yes |
| Call Cancel | - | - | yes |
| Call Queueing | - | - | yes |

FIG. 7

| AISIP proprietary fields for the MESSAGE method | | | |
|---|---|---|---|
| Field | Description | Values | Individual / Group Notes |
| externalService= | It describes the type of service that is transported over a SIP MESSAGE.<br><br>It can deliver either a Request or an Acknowledgement. | checkReq | Individual |
| | | checkAck | |
| | | enableReq | Individual |
| | | enableAck | |
| | | disableReq | Individual |
| | | disableAck | |
| | | killReq | Individual (Tier III only) |
| | | killAck | |
| | | alertReq | Individual / In Tier III it is used for FOACSU Call |
| | | alertAck | |
| | | monitorReq | Individual |
| | | monitorAck | |
| | | oacsuReq | |
| | | oacsuAck | |
| | | emergencyReq | Group (Tier II only) |
| | | emergencyAck | Individual (Tier II only) |
| | | groupMsgUnc | Group |
| | | indivMsgUnc | Individual |
| | | indivMsgCon | |
| | | indivMsgAck | |
| | | featNotSupp | Individual (Tier III only) |
| | | sysBusy | |
| | | partyNotAvailable | |
| | | callCancel | |
| | | callQueued | |
| | | callRejected | |
| externalEnc= | It defines whether the call use Encryption or not<br>If the field is not used, it means not to use encryption during transmission | 0 indicates no encryption<br>1 indicates encryption was used | Used in case of:<br>- groupMsgUnc<br>- indivMsgUnc<br>- indivMsgCon |
| sourceGw= | It defines the DMR ID of the Gateway that generates the SIP MESSAGE method (containing a Request or an Ack). | Range [1, 16777215] | |
| format= | It defines the format of the payload contained in the text= field. Values are 16 bit Unicode characters (UTF-16BE) and ISO 8 bit character set (ISO/IEC 8859) | UTF-16<br>ISO-8 | Used in case of:<br>- groupMsgUnc<br>- indivMsgUnc<br>- indivMsgCon |
| payload= | It contains the payload of a text message.<br>Text "Bye" is transferred using 12 characters as 420079006500 if format=UTF-16<br>Text "Bye" is transferred using 6 characters as 427965 if format=ISO-8 | The payload is transferred in binary format in nibble | Used in case of:<br>- groupMsgUnc<br>- indivMsgUnc<br>- indivMsgCon |

FIG. 9

| AISIP proprietary headers for the INVITE method ||||
| header | description | values | Notes |
| --- | --- | --- | --- |
| Service: | It describes the type of service that is transported over a SIP INVITE | group | Group half-duplex Call |
| | | ind-half | Individual half-duplex Call |
| | | dial⁶ | Radio-telephone Call |
| | | broadcast | Broadcast Call (Tier III) |
| | | g-dial | Radio-telephone GROUP Call. Can be set-up by AISIP Server only |
| External-Enc: | It defines whether the call use Encryption or not (as defined by the DMRA). It is composed by two values: Alg ID (1→7) and Key ID (1→255) | 0 indicates no encryption | The received call from the Air Interface is not encrypted Or It shall be used to set-up a not encrypted call toward the Air Interface |
| | | 1 indicates to use the predefined encryption | It shall be used to set-up an encrypted call toward the Air Interface. The DMR Gateway SHALL use its own predefined encryption algorithm and key |
| | | [257:2047] | Alg_ID*256 + Key_ID indicates encrypted call Example: 257 means - Alg-ID = 1 ARC4 and - Key-ID = 1 |
| Source-Gw: | It is the DMR ID (number) of the Gateway that sets up the AISIP call | Range [1, 16777215] | |
| Priority: | Standard SIP header which defines the priority of the call. Mapping of Priority: values with Air Interface is explained in Table 7 | emergency | Indicates Emergency Call |
| | | pre-emptive | Indicates Pre-emptive Call |
| | | urgent | High priority call |
| | | normal | Normal call |
| | | not-urgent | Not urgent call |

FIG. 12

SESSION INITIATION PROTOCOL EXTENSION FOR DIGITAL MOBILE RADIO NETWORKS MATCHING PRIVATE OR PROFESSIONAL MOBILE RADIO FEATURES

TECHNICAL FIELD OF THE INVENTION

The present invention relates to a signalling communications protocol, hereinafter briefly referred to as AISIP (SIP-based Application Interface Specification) Protocol, that uses and extends the standard Session Initiation Protocol (SIP) suite version 2.0 defined in the Request for Comments (RFC) RFC 3261 and associated RFCs (RFC 4566: Session Description Protocol (SDP), RFC 3550: Transport Protocol for Real-Time Applications (RTP), and RFC 3428: SIP Extension for Instant Messaging), in order to interface Control Centres/Rooms with Digital Mobile Radio (DMR) Networks so as to match/support Private/Professional Mobile Radio (PMR) features, as defined in the ETSI DMR Tier II and Tier III standards, in the Digital Mobile Radio Association (DMRA) specifications and in the presently available DMR implementations.

BACKGROUND ART

SIP is a signalling communications protocol widely used for controlling multimedia communication sessions such as voice and videos over Internet Protocol (IP) networks.

In the ISO/OSI model, SIP is an "Application" layer protocol which is based on Internet Protocol (IP) and User Datagram Protocol (UDP), or other transport protocols, and is used to create, modify, and terminate sessions with one or more participants. These sessions include Over the Internet phone calls, multimedia distribution, and multimedia conferences. SIP "Calls" used to create sessions carry session descriptions that allow participants to agree on a set of compatible media.

SIP makes use of proxy servers to allow routing of requests to the current user positions, user authentication, user authorization for certain services, implementation of service provider-specific call routing policies and provision of services to their users.

SIP also manages the user registration function, which is handled by the proxy servers, so as to have always a real-time updated control of the users in a given area.

OBJECT AND SUMMARY OF THE INVENTION

A comparative analysis of the standard SIP suite, in particular RFC 3261 and RFC 3428, and the DMR Tier II and Tier III shows that matches are already available between DMR Tier II and Tier III features and SIP features and that some extensions are required to make the SIP interfaceable with DMR networks so as to match/support PMR features.

Available matches and required extensions are listed in the Table shown in FIG. 1.

The present invention is aimed at providing a SIP extension for DMR networks matching PMR features that:
is as close as possible to the standard SIP by introducing extensions to the standard SIP only when strictly needed,
is as close and as compatible as possible to the SIP used by COTS (Commercial Off The Shelf) SIP entities and Open Source SIP entities,
is as independent as possible of the DMR air-interface protocol,
minimizes the overall delay introduced in a DMR system and the bandwidth needed,
permits scalable solutions,
permits further extensions to be added (e.g. Duplex Call, OTAR—Over The Air Rekeying), and
allows AISIP entities to interconnect with one another using SIP standard entities for the following functionalities: call routing (by means of Proxy Servers), registration (by means of Registrar), voice recording, messaging, discreet listening, late entry, etc.

This aim is achieved by the system, the SIP Proxy Server and the DMR Gateway claimed in the appended claims.

In broad outline, the system comprises:
a SIP Proxy Server, and
one or more DMR Gateways to interface the SIP Proxy Server with one or more DMR Networks matching Private/Professional Mobile Radio (PMR) features;
wherein each DMR Gateway is univocally assigned with a SIP ID and is designed to:
interpret messages from the SIP Proxy Server to manage DMR signalling/data/voice features toward DMR Terminals,
initiate DMR features on account of DMR Terminals operating under it and make requests for DMR signalling/data/voice features toward destinations belonging to another Network, and
transcode an over-the-air, manufacturer-specific DMR Terminal registration into a SIP REGISTER message to result in the SIP Proxy server perceiving and managing the DMR Terminal as a SIP User Agent;
and wherein the SIP Proxy Server is designed to:
manage DMR signalling, including voice call set-up, and/or DMR data features using the SIP MESSAGE method, and/or
manage DMR signalling/data/voice group features.

BRIEF DESCRIPTION OF THE DRAWINGS

For a better understanding of the present invention, preferred embodiments, which are intended purely by way of example and are not to be construed as limiting, will now be described with reference to the attached drawings, wherein:

FIG. 1 shows a Table indicating available matches between DMR Tier II and Tier III features and SIP features and required extensions of the SIP to support non-matching DMR features;

FIG. 5 shows a resumptive table of the DMR IDs and IP Addresses of the AISIP-based system entities;

FIG. 6 shows a table indicating DMR end-to-end data/signalling features among DMR MSs and among DMR MSs and Dispatchers/Dispatcher Gateways that are transported using the MESSAGE method;

FIG. 7 shows a table indicating DMR voice features and sub-features whose associated information is transported using MESSAGE method;

FIG. 9 shows a Table indicating the AISIP proprietary fields that can be conveyed in a MESSAGE message for signalling/data/voice features.

FIG. 12 shows a Table indicating the AISIP proprietary fields that can be conveyed in an INVITE message for voice features.

DETAILED DESCRIPTION OF PREFERRED EMBODIMENTS OF THE INVENTION

The following description is provided to enable a skilled person to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended description and claims.

Figure 2:
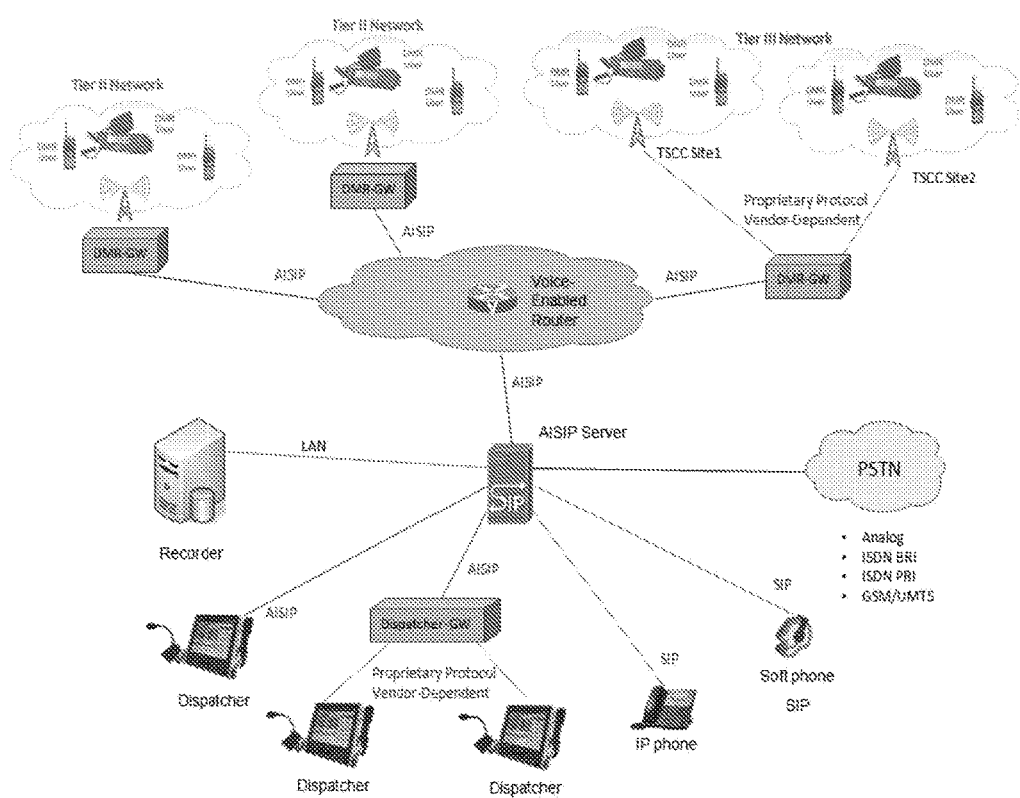
FIG. 2 depicts a reference AISIP-based system according to the present invention.

FIG. 2 is a self-explanatory depiction of a reference architecture of an AISIP-based System, which basically comprises the following two main network entities:

an AISIP Server, and one or more DMR Gateways, in the example shown in the number of three, to interface the AISIP Server with associated Tier II or Tier III DMR Networks.

The AISIP Server is a SIP Proxy Server designed to expose, among the others (such as text messaging, localization, radio monitoring, radio check, emergency alarms, talking party identification), the following additional functionalities:

Registrar management of mobility of DMR Terminals and Dispatchers via the Registrar functionality, management of call routing among AISIP and SIP entities, management of group calls when interconnecting more Dispatchers/Dispatcher Gateways and/or DMR Networks and/or more DMR Terminals, floor arbitration, interface to voice recording devices, radio traffic logging, management of interface to other AISIP Systems, interface to telephone gateway toward the public network (PSTN/GSM), and interface to VoIP (e.g SIP) and Analog PABX Interface to Control Centre.

The DMR Gateway is a Gateway that provides to DMR Access Networks the AISIP interface toward AISIP Server or toward a Control Centre and has the tasks of:

terminating the AISIP protocol, by interpreting the messages coming from the AISIP Server or the Control Centre in order to manage DMR voice, signaling and data features toward the correct DMR individual or group destination IDs, and initiating the DMR features on account of the DMR Terminal(s) operating under it and making a request for a DMR voice, signaling and data feature toward destination IDs belonging to another Network or to Control Centre.

For these purposes, a SIP ID is univocally assigned to each DMR Gateway. In the case of Tier II Networks, one ID per Time Slot is defined, while in case of Tier III Networks one ID per site is defined. The IDs are registered by the DMR Gateways to the Registrar.

The information on the type of call that the DMR Gateway has to set up, the IDs of the involved DMR Terminals and the signalling messages that need to be conveyed to manage the calls on the DMR air interface (PTT exchanges) are the most important elements of the AISIP protocol and are obtained by means of proprietary headers added to the standard SIP protocol.

Thanks to the DMR Terminal registration feature, the DMR Gateway permits to the DMR Terminals to be recognized and managed by the AISIP server as AISIP entities.

One DMR Gateway may manage one or more DMR Networks, either Tier II or Tier III.

Figure 3:
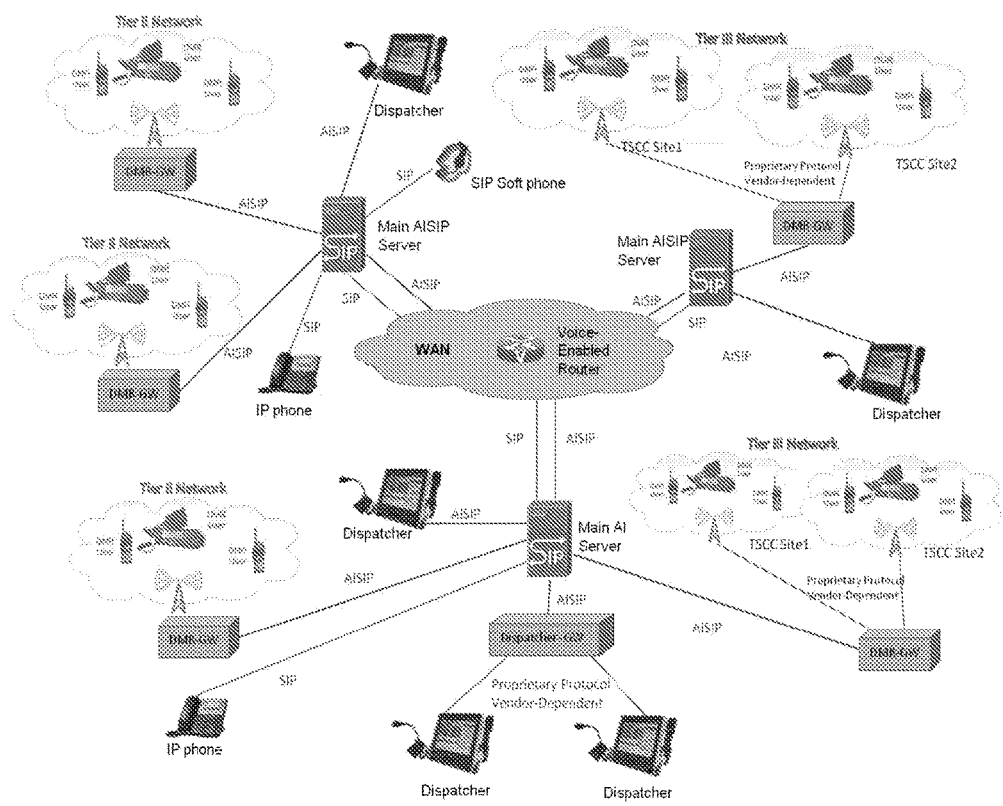
FIG. 3 depicts a scaled-up AISIP-based system according to the present invention.

The reference AISIP System shown in FIG. 2 may be scaled up, and FIG. 3 self-explanatorily depicts an example of a scaled-up AISIP-based System.

As shown in FIG. 3, in the case of geographical systems, a Main AISIP Server can be used to manage more Control Rooms and more DMR Networks.

The reference AISIP System shown in FIG. 2 may also be scaled down against the loss of some functionalities, which will be described in detail below, with respect to the reference AISIP system.

In particular, the AISIP can be used also in systems with a simplified architecture in which a SIP Redirect Server is used instead of an AISIP Server. All the SIP requests issued by an AISIP User Agent are addressed to the SIP Redirect Server which always answers by issuing a SIP 3xx Redirect response, indicating the correct destination, following a static or semi-static mapping table present in the SIP Redirect Server. The AISIP User Agent re-issues a request to the correct destination and the SIP Redirect Server is no more involved in the exchange of signaling among the endpoints. Also the RTP stream is directly exchanged among the endpoints, without any involvement of the SIP Redirect Server.

This architecture could be further simplified down to one Dispatcher Gateway and one DMR Gateway. The low end is a "Minimal AISIP System" in which no Redirect Server is present and signalling exchange and data/voice calls are directly addressed from the MS to a single Dispatcher/Dispatcher Gateway and vice versa.

Coming now to the functional differences between the AISIP and the SIP, the AISIP exposes the following additional features:

1. Transcoding of air-interface manufacturer-specific registration protocol into a SIP standard REGISTER message, 2. Management of DMR signalling features, including voice call set-up, and DMR data features, using the SIP MESSAGE method, and 3. Management of DMR signalling/data/voice group features.

1. Transcoding of Air-Interface Manufacturer-Specific Registration Protocol into a SIP Standard REGISTER Message According to a first, independent aspect of the present invention, each DMR Gateway transcodes the over-the-air manufacturer-specific MS registration into a SIP standard REGISTER message, which, as is known, is intended to be used by a User Agent (UA) to indicate its current IP address and the URLs for which it would like to receive calls.

This lets the AISIP server perceive and manage a DMR MS as a SIP/AISIP User Agent.

The purposes of registration include:

managing mobility of the MSs operating under different DMR Gateways, providing the basis for location features and applications based on location features, and efficiently using the air interface: the knowledge of under which DMR Gateway a MS is operating gives the possibility to the AISIP-based system to use the radio interface only where needed. That is very useful in individual calls, group calls and signalling features, as the calls/requests can be forwarded only toward those Gateways under which target MSs are operating.

At power on, all kinds of AISIP entities register: DMR Gateways, Dispatchers, Dispatcher Gateways, DMR Terminals.

At power off, some AISIP entities deregister: Dispatchers and DMR Terminals.

For Registration feature, standard SIP already provides all the protocol items and no new headers or other proprietary extensions are needed.

Figure 4:
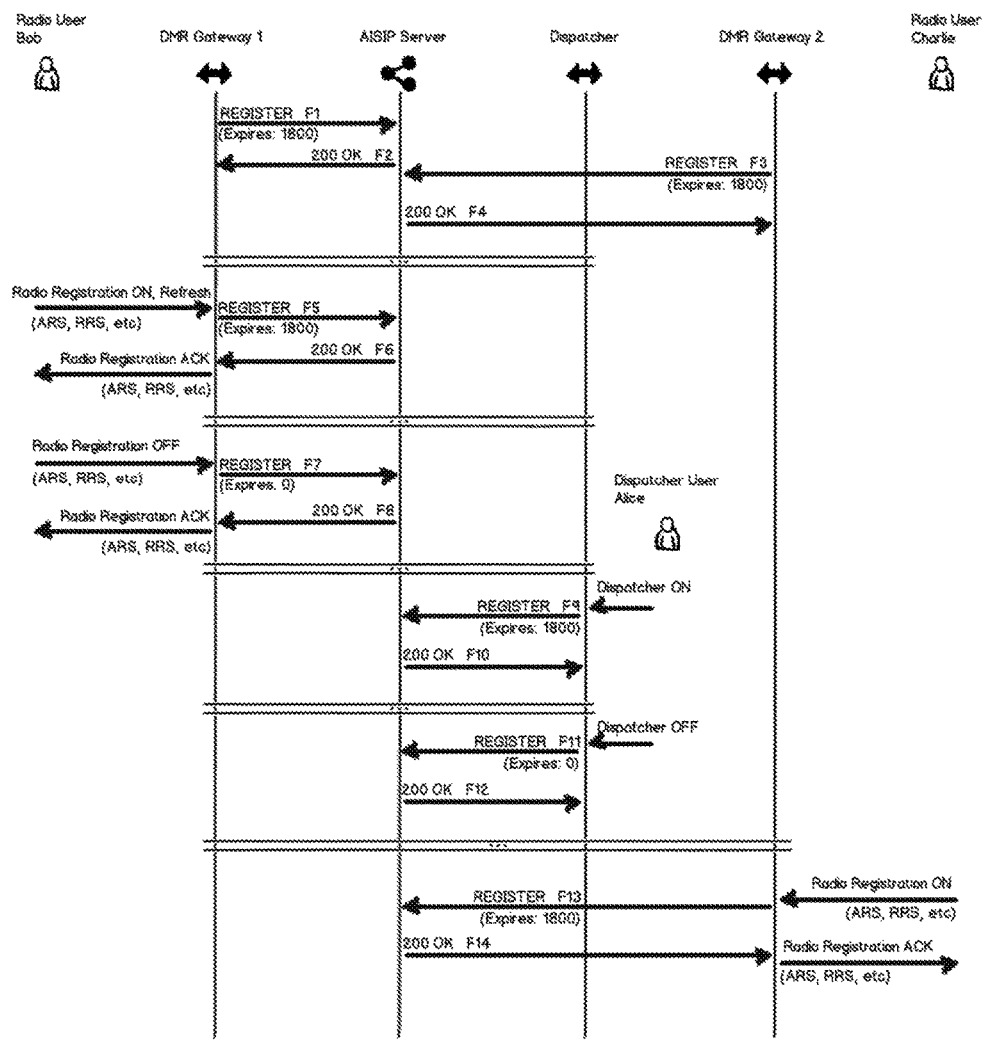
FIG. 4 depicts a Message Sequence Chart (MSC) relating to the registration and deregistration of AISIP entities.

FIG. 4 depicts a Message Sequence Chart (MSC) relating to the registration and deregistration of AISIP entities.

In FIG. 4, two DMR Gateways are depicted, namely DMR Gateway 1 and DMR Gateway 2, with DMR IDs 1004 and 1005 and IP addresses 192.168.63.14 and 192.168.63.15, respectively.

Two Radio Users Bob and Charlie (DMR Terminals) are depicted, with DMR IDs 304 and 305 and which operate under DMR Gateway 1 and under DMR Gateway 2, respectively.

The AISIP Server has 192.168.63.1 as its IP address.

A resumptive table of the DMR IDs and IP Addresses of all the AISIP-based system entities involved in the MSC shown in FIG. 4 (and in the other Figures showing MSCs) is depicted in FIG. 5.

As shown in FIG. 4, after the DMR Gateways have registered with the AISIP Server using a Registration Message of the type reproduced below (this is the one relating to Gateway 1):

F1 REGISTER DMR Gateway1 (ID 1004)→AISIP Server
REGISTER sip:192.168.63.1 SIP/2.0
Via: SIP/2.0/UDP 192.168.63.14:5060;rport;branch=z9hG4bkC-1004
Max-forwards: 70
From: <sip: 1004@192.168.63.1>;tag=C0A83F0C-1004
To: <sip: 1004@192.168.63.1>
Call-ID: 85.1004
CSeq: 4 REGISTER
User-Agent: AISIP-DMRGateway
Contact: <sip: 1004@192.168.63.14:5060>
Expires: 1800
Content-Length: 0

DMR Terminals may then register with the AISIP Server, each one using the following Registration Message:

F5 REGISTER Bob (ID 304)→AISIP Server
REGISTER sip:192.168.63.1 SIP/2.0
Via: SIP/2.0/UDP 192.168.63.14:5060;rport;branch=z9hG4bkC-304
Max-forwards: 70
From: <sip:304@192.168.63.1>;tag=C0A83F0C-304
To: <sip:304@192.168.63.1>
Call-ID: 85.304
CSeq: 1 REGISTER
User-Agent: AISIP-DMRGateway
Contact: <sip:304@192.168.63.14:5060>
Expires: 1800
Content-Length: 0.

Deregistration of the DMR MSs may be made using a Deregistration Message of the type reproduced below:

F7 REGISTER Bob (ID 304)→Registrar
REGISTER sip:192.168.63.1 SIP/2.0
Via: SIP/2.0/UDP 192.168.63.14:5060;rport;branch=z9hG4bkC-304
Max-forwards: 70
From: <sip:304@192.168.63.1>;tag=C0A83F0C-304
To: <sip:304@192.168.63.1>
Call-ID: 85.304
CSeq: 2 REGISTER
User-Agent: AISIP-DMRGateway
Contact: <sip:304@192.168.63.14:5060>
Expires: 0
Content-Length: 0.

Responsively to the (De)Registration Messages sent, corresponding SIP 200 OK Response Messages are issued by the recipients (AISIP Server or Registrar), which response messages are ack messages for the SIP protocol only and are used to indicate that the (De)Registration Messages have been received by the AISIP entities. They do not indicate acks for the requested signalling service.

2. Management of DMR Signalling Features, Including Voice Call Set-Up, and DMR Data Features Using the SIP MESSAGE Method According to a different, independent aspect of the present invention, DMR signalling features, including voice call set-up, and/or data features are managed using the SIP MESSAGE method.

In the present invention, the SIP standard MESSAGE method is used to transport:

information associated to some end-to-end data/signalling features, such as text message, location data, etc., among DMR Terminals and among DMR Terminals and Dispatchers/Dispatcher Gateways, and information needed to set up individual voice calls and to manage some voice-related features, by means of sub-features.

The SIP standard MESSAGE method is used to convey signalling features that are managed over the air interface via CSBK (Control Signalling BlocK) or data bearer services such as IP over DMR and Short Data.

This method permits to convey any signalling among DMR MSs from one DMR Gateway to other DMR Gateways or Dispatchers or Dispatcher Gateways passing through AISIP Servers.

Signalling service requests (like Radio Enable request), signalling service acknowledgments (like Radio Enable ack) and messages needed to set up a voice call (like OACSU signalling) are examples of such messages.

These messages are managed in a stateless way by the AISIP Server and DMR Gateways of Tier II systems, as Tier II MSs implement a state-machine managing retries.

Instead, these messages are managed in a stateful way by the AISIP server and DMR Gateways of Tier III systems, as in Tier III systems retries are managed by Trunking Site Control Channels (TSCCs).

The MESSAGE method conveys a service request or a service ack. Information related to the type of service, the DMR source ID, the DMR target ID and the DMR Gateway ID originating the SIP MESSAGE are embedded in the Message Body using a text/plain format. Proprietary headers are not used in MESSAGE messages.

A 200 OK response message is issued by the AISIP entities to indicate that the MESSAGE method has been received and it does not indicate an ack for the requested signalling service.

DMR end-to-end data/signalling features among DMR MSs and among DMR MSs and Dispatchers/Dispatcher Gateways that are transported using the MESSAGE method are listed in the table shown in FIG. 6, while DMR voice features and sub-features whose associated information is transported using MESSAGE method are listed in the table shown in FIG. 7.

Figure 8:
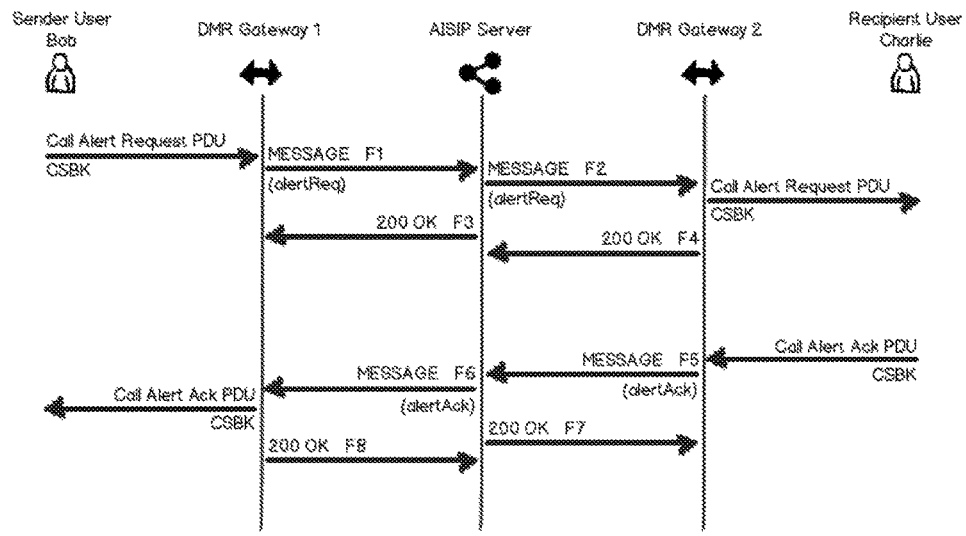
FIG. 8 depicts a Message Sequence Chart (MSC) showing the SIP messages involved in a Call Alert Request.

FIG. 8 depicts a Message Sequence Chart (MSC) showing the SIP messages involved in a Call Alert Request, wherein the type of service conveyed by the MESSAGE method (by means of the externalService=field) is shown in the MSC between brackets and the network entities involved are the same as those shown in FIG. 4.

Call Alert Request from DMR MSs are made using a message of the type reproduced below:

F1 MESSAGE Bob (ID 304)→AISIP Server
MESSAGE sip:305@192.168.63.1 SIP/2.0
Via:     SIP/2.0/UDP     192.168.63.14:5060;rport; branch=z9hG4bkC-304
Max-forwards: 70
From: <sip:304@192.168.63.1>;tag=C0A83F0C-304
To: <sip:305@192.168.63.1>
Call-ID: 85.304
CSeq: 1 MESSAGE
User-Agent: AISIP-DMRGateway
Content-Type: text/plain
Content-Length: 39
externalService=alertReq
sourceGw=1004 while the Call Alert Requests are delivered to the other DMR Mss using a similar message of the type reproduced below:

F2 MESSAGE AISIP Server→Charlie (ID 305)
MESSAGE sip:305@192.168.63.15 SIP/2.0
Via: SIP/2.0/UDP
192.168.63.1:5060;rport;branch=z9hG4bk7
Max-forwards: 70
From: <sip:304@192.168.63.1>;tag=C0A83F0C-304
To: <sip:305@192.168.63.15>
Call-ID: 123456789
CSeq: 9 MESSAGE
Server: AISIP-DMRServer
Content-Type: text/plain
Content-Length: 39
externalService=alertReq
sourceGw=1004

As it may be appreciated, the Message Body conveys in text/plain the following information:

externalService=indicates the DMR terminal feature
sourceGw=indicates the SIP ID of the AISIP entity (either a DMR Gateway or a Dispatcher/Dispatcher Gateway) generating the service request.

The same exchange of messages with a different value for the field externalService=is used in case for many other features.

Here below is a list of these features and sub-features:
MS Radio Check Request (checkReq)
MS Radio Check Ack (checkAck)
Radio Enable Request/MS Revive Request (enableReq)
Radio Enable Ack/MS Revive Ack (enableAck)
Radio Disable Request/MS Stun Request (disableReq)
Radio Disable Ack/MS Stun Ack (disableAck)
Call Alert Request (alertReq)
Call Alert Ack (alertAck)
Radio Monitor Request/Ambience Listening Request (monitorReq)
Radio Monitor Ack/Ambient Listening Ack (monitorAck)
MS Kill Request (killReq)
MS Kill Ack (killAck)
OACSU Request (oacsuReq)
OACSU Ack (oacsuAck)
Emergency Request (emergencyReq)
Emergency Ack (emergencyAck)
Group Message (groupMsgUnc)
Feature Not Supported (featNotSupp)
System Busy (sysBusy)
Party Not Available (partyNotAvailable)
Call Cancel Service (callCancel)
Call Queued (callQueued)
Individual Confirmed Message Text (indivMsgCon)
Individual Confirmed Message Ack (indivMsgAck)
Individual Unconfirmed Message Text (indivMsgUnc)
Location Polling Request (gpsRequest)
Location Polling Response (gpsResponse)
Location Trigger ON Request (gpsTriggerOn)
Location Trigger ON Reply (gpsTriggerOnAck)
Location Trigger Response (gpsTriggerResponse)
Location Trigger OFF Request (gpsTriggerOff)
Location Trigger OFF Reply (gpsTriggerOffAck).

The AISIP proprietary fields that can be conveyed in a MESSAGE method for signalling/data features are listed in the table shown in FIG. 9.

3. Management of DMR Signalling/Data/Voice Group Features

According to a different, independent aspect of the present invention, the AISIP server is designed to recognize if a DMR signalling/data/voice feature is an individual or a group signalling/data/voice feature:

in the case the a DMR data/signalling group feature is recognized, the AISIP server is designed to generate one SIP MESSAGE method for each DMR Gateway or Dispatcher or Dispatcher Gateway to be involved, and in the case a DMR voice group feature is recognized, the AISIP server is designed to implement a conference server that generates many SIP sessions using the SIP INVITE method, one session for each DMR Gateway or Dispatcher or Dispatcher Gateway to be involved. The ASIP server is also designed to implement the floor arbitration and forwards the RTP stream of the AISIP entity holding the floor towards all the involved Gateways, transcoding the payload into the right codec, if necessary.

3.1 DMR Data/Signalling Group Features

Figure 10:
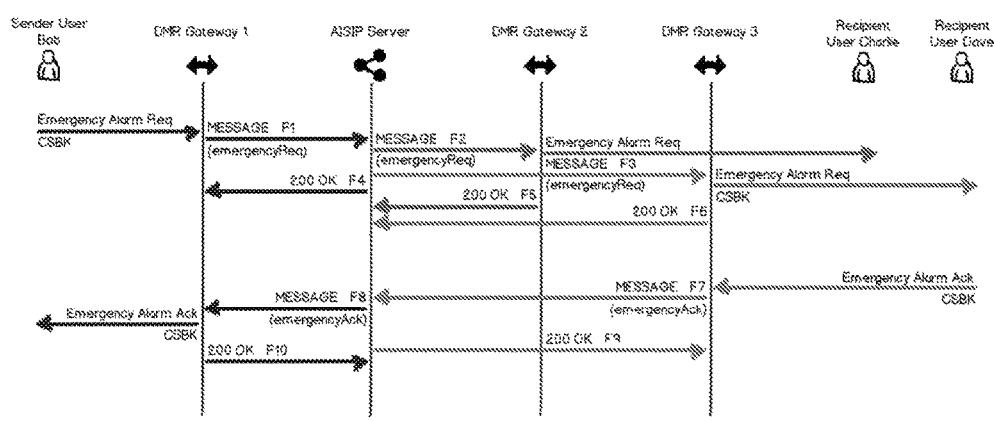
FIG. 10 depicts a Message Sequence Chart (MSC) showing the SIP messages involved in an Emergency Alarm Request.

FIG. 10 depicts a Message Sequence Chart (MSC) showing the SIP messages involved in an Emergency Alarm Request, wherein the type of service conveyed by the MESSAGE method (by means of the externalService=field) is shown in the MSC between brackets and the network entities involved are the same as those shown in FIGS. 4 and 7.

Emergency Alarm Requests are made using a message of the type reproduced below, where "9999" is used as recipient ID.

F1 MESSAGE Bob (ID 304)→AISIP Server
MESSAGE sip:9999@192.168.63.1 SIP/2.0
Via:     SIP/2.0/UDP     192.168.63.14:5060;rport; branch=z9hG4bkC-304
Max-forwards: 70
From: <sip:304@192.168.63.1>;tag=C0A83F0C-304
To: <sip:9999@192.168.63.1>
Call-ID: 100.304
CSeq: 9584 MESSAGE
User-Agent: AISIP-DMRGateway
Content-Type: text/plain
Content-Length: 39
externalService=emergencyReq
sourceGw=1004

Emergency Alarm Requests are propagated to the other DMR MSs using the same type of message, but with the corresponding recipient IDs, and a 200 OK response message is issued by the AISIP entities to indicate that the MESSAGE messages have been received.

An exchange of messages similar to the case of Emergency Alarm Request with a different value for the field externalService=is used in case of Group Message: groupMsgUnc.

3.2 DMR Voice Group Features

According to a different, independent aspect of the present invention, all the DMR group voice calls (including Emergency Call and All Call) among AISIP entities are set up using the SIP INVITE method, which, as is known, is intended to be used to establish a media session between User Agents (UAs). Information related to the type of call, source Gateway ID, encryption algorithm identifier and key identifier are embedded in the INVITE message using proprietary headers.

For Tier II Networks, the INVITE method is invoked at the reception from the DMR Air Interface of the UU_V_Ch_Usr Full Link Control PDU (Protocol Data Unit) in case of Individual call, or the Grp_V_Ch UsrFull Link Control PDU in case of Group, Emergency and All calls.

For Individual Calls this happens both in case of PATCS Call and in case of OACSU Call. The same happens in case of FOACSU Call (or a call after a Call Alert signaling) and Remote Monitor Voice Service. At the end of the signalling exchange between the sender and the recipient conveyed over SIP via the MESSAGE method, the INVITE method is used at the reception of Full Link Control PDU (Voice Link Control Header or Embedded Signalling in case of late entry).

For Tier III Networks the INVITE method is invoked at the reception from the DMR Air Interface of the IndividualVoiceCall Service Request CSBK PDU in case of Individual call or the TalkGroupVoiceCall Service Request CSBK PDU in case of Group and Broadcast calls.

For Individual Calls this happens both in case of OACSU Call and in case of FOACSU Call. At the end of the signalling exchange between the sender and the recipient conveyed over SIP via the MESSAGE method, the INVITE method is used at the reception of ACKU PDU from the Called Party.

An INVITE message that embeds the AISIP proprietary headers means that the originator of the SIP call is an AISIP entity and that it is willing to place a call, on behalf of a DMR terminal.

The 200 OK+SDP used to accept an AISIP INVITE request containing AISIP proprietary headers indicates that the recipient of the call is an AISIP entity too.

As a consequence of this set up, the AISIP entities involved will exchange voice stream by means of PTT exchanges.

Figure 11:
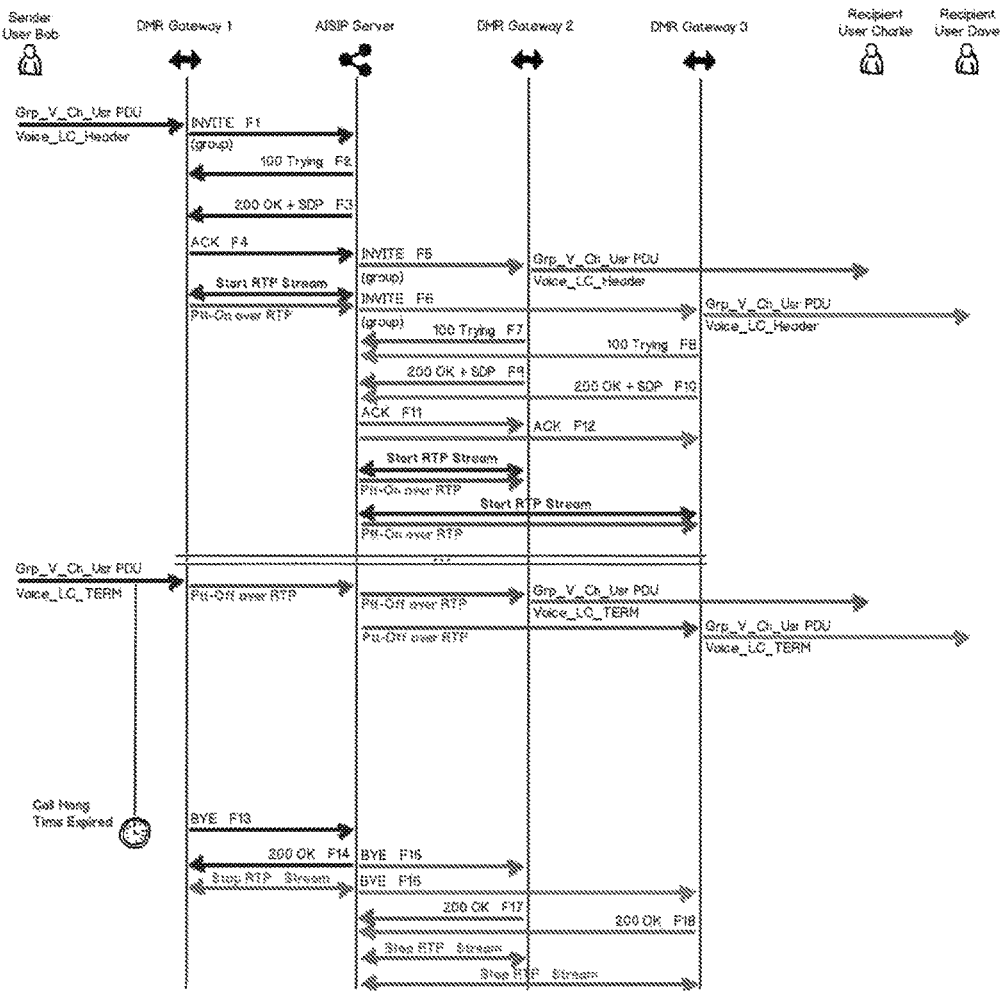
FIG. 11 depicts a Message Sequence Chart (MSC) showing the SIP messages involved in a Tier II Group Voice Call.

FIG. 11 depicts a Message Sequence Chart (MSC) showing the SIP messages involved in a Tier II Group Voice Call, wherein the type of service conveyed by the INVITE method (by means of the Service:field) is shown in the MSC between brackets and the network entities involved are the same as those shown in FIG. 10.

Group calls are managed by the AISIP Server in a Back2Back User Agent fashion. This means that the AISIP Server accepts the call by terminating the SIP and RTP signalling and set-up new SIP calls towards the DMR Gateway that are involved in the call. Moreover the AISIP Server forwards RTP signalling from the Gateway where a subscriber is talking towards the other involved Gateways.

DMR Group Voice Calls are set up using messages of the type reproduced below:

F1 INVITE DMR Gateway1 (ID 1004)→AISIP Server
INVITE sip:9999@192.168.63.1 SIP/2.0
Via: SIP/2.0/UDP 192.168.63.1:5060;rport;branch=z9hG4bkC-1004
Max-forwards: 70
From: <sip:304@192.168.63.1>;tag=C0A83F0C-1004
To: <sip:9999@192.168.63.1>
Contact: <sip:1004@192.168.63.14:5060>
Call-ID: 215.1004
CSeq: 12345 INVITE
Priority: normal
Service: group
External-Enc: 257
Source-Gw: 1004
User-Agent: AISIP-DMRGateway
Content-Type: application/sdp
Content-Length: 208
v=0
o=–3525165961 3525165962 IN IP4 192.168.63.14
s=voicecall
c=IN IP4 192.168.63.114
t=0 0
m=audio 5006 RTP/AVP 0 8 127
a=rtpmap: 0 PCMU/8000
a=rtpmap: 8 PCMA/8000
a=rtpmap: 127 AMBE+2
a=sendrecv It may be appreciated that the INVITE message includes proprietary headers describing information of the call:
Service: indicates the call type, and
Source-Gw: indicates the SIP ID of the AISIP entity (either a DMR Gateway or a Dispatcher/Dispatcher Gateway) generating the SIP call.

When the AISIP Server receives the INVITE message, it responsively generates a 200 OK+SDP before generating the INVITE request to the other AISIP entities involved in the call. The 200 OK+SDP message must include the Service: proprietary header. This indicates to the DMR Gateway 1 that the also recipient of the INVITE message (the SIP Server, which is an AISIP Server) is an AISIP entity and, as such, able to manage PTT.

The AISIP proprietary fields that can be conveyed in an INVITE message for voice features are listed in the table shown in FIG. 12.

In view of the foregoing, it may be appreciated that the AISIP of the present invention allows all the aims indicated in the introductory part of the description to be met, namely it is very close to the standard SIP because it introduces extensions to the standard SIP only when strictly needed, it is close and compatible to the SIP used by COTS SIP entities and by open source SIP entities, it is independent of the DMR air-interface protocol, it minimizes the overall delay introduced in a DMR system and the bandwidth needed, it permits scalable solutions and further extensions to be added (e.g. Duplex Call, OTAR), and it allow AISIP entities to interconnect with one another using SIP standard entities for call routing (by means of Proxy Servers), registration (by means of Registrar), and voice recording.

The invention claimed is:

1. A system, comprising:
a Session Initiation Protocol (SIP) Proxy Server; and
one or more Digital Mobile Radio (DMR) Gateways to interface the SIP Proxy Server with one or more DMR Networks matching Private/Professional Mobile Radio (PMR) features;

wherein the SIP Proxy Server is configured to:
  manage a plurality of features, the plurality of features including DMR signalling features, DMR data features, and DMR voice features, each of the plurality of features configured for use with an individual or a group;
  manage the DMR signalling features, including voice call set-up, and the DMR data features using a SIP method including a SIP message;
  manage the DMR voice features using a SIP method;
  recognize if a feature of the plurality of features is associated with the individual or the group;
  if the feature recognized is one of the DMR data features or the DMR signalling features and is associated with the group, send one message to each of the DMR Gateways to be involved in the group;
  if the feature recognized is one of the DMR voice features and is associated with the group, implement a conference server that generates additional SIP sessions using the SIP method, one session of the additional SIP sessions for each of the DMR Gateways to be involved in the group;
  if the feature recognized is one of the DMR data features or the DMR signalling features, including the voice call set-up, and is associated with the individual, send a message to a DMR Gateway to be involved with the individual; and
  if the feature recognized is one of the DMR voice features and is associated with the individual, generate a SIP session to a DMR Gateway to be involved with the individual using the SIP method.

2. The system of claim 1, wherein the SIP Proxy Server is further configured to:
  if the feature recognized is one of the DMR voice features and is associated with the group, implement a floor arbitration and forward a Real-Time Applications (RTP) stream from an SIP floor-holding entity towards the DRM Gateways involved with the group.

3. The system of claim 1, wherein the SIP Proxy Server is further configured to:
  implement a Registrar;
  manage mobility of DMR Terminals via the Registrar;
  manage call routing among system entities; and
  manage group calls when interconnecting:
    more Dispatchers and Dispatcher Gateways; or
    DMR Networks and more DMR Terminals.

4. The system of claim 1, wherein, when the SIP method is used to convey either a service request or a service acknowledgment, information is embedded in a Message Body of the SIP message using a text/plain format, the information being related to:
  a type of service selected from the service request or the service acknowledgement; and
  a DMR Gateway identification originating the SIP message.

5. The system of claim 1, wherein the DMR Gateway to be involved with the individual and the DMR Gateways to be involved in the group are each univocally assigned with a SIP identification and designed to:
  interpret messages from the SIP Proxy Server to manage the plurality of features toward DMR Terminals;
  initiate one or more features of the plurality of features in response to the DMR Terminals operating under the DMR Gateway and make requests for the plurality of features toward destinations belonging to another Network; and
  transcode an over-the-air, manufacturer-specific DMR Terminal registration into a SIP message to result in the SIP Proxy perceiving and managing the DMR Terminal as a SIP User Agent.

6. A system, comprising:
  a session initiation protocol (SIP) proxy server configured to:
    manage a plurality of features, the plurality of features including digital mobile radio (DMR) signalling features, DMR data features, and DMR voice features, each of the plurality of features configured for use with an individual or a group;
    manage the DMR signalling features, including voice call set-up, and the DMR data features using a SIP message method including a SIP message;
    manage the DMR voice features using a SIP invite method;
    recognize a feature of the plurality of features is associated with the individual or the group;
    if the feature recognized is one of the DMR data features or the DMR signalling features and is associated with the group, send one message to each of the DMR gateways to be involved in the group;
    if the feature recognized is one of the DMR voice features and is associated with the group, implement a conference server that generates additional SIP sessions using the SIP invite method, one session of the additional SIP sessions for each of the DMR gateways to be involved in the group;
    if the feature recognized is one of the DMR data features or the DMR signalling features, including the voice call set-up, and is associated with the individual, send a message to a DMR gateway to be involved with the individual; and
    if the feature recognized is one of the DMR voice features and is associated with the individual, generate a SIP session to a DMR gateway to be involved with the individual using the SIP invite method.

7. The system of claim 6, wherein the SIP proxy server is further configured to, if the feature recognized is one of the DMR voice features and is associated with the group, implement a floor arbitration and forward a real-time applications (RTP) stream from an SIP floor-holding entity towards the DRM gateways involved with the group.

8. The system of claim 6, wherein the SIP proxy server is further configured to:
  implement a registrar;
  manage mobility of DMR terminals via the registrar;
  manage call routing among system entities; and
  manage group calls when interconnecting:
    more dispatchers and dispatcher gateways; or
    DMR networks and more DMR Terminals.

9. The system of claim 6, wherein, when the SIP message method is used to convey either a service request or a service acknowledgment, information is embedded in a message body of the SIP message using a text/plain format, the information being related to:
  a type of service selected from the service request or the service acknowledgement; and
  a DMR gateway identification originating the SIP message.

10. The system of claim 6, wherein the DMR gateway to be involved with the individual and the DMR gateways to be involved in the group are each univocally assigned with a SIP identification and designed to:
  interpret messages from the SIP proxy server to manage the plurality of features toward DMR terminals;

initiate one or more features of the plurality of features in response to the DMR terminals operating under the DMR gateway and make requests for the plurality of features toward destinations belonging to another network; and transcode an over-the-air, manufacturer-specific DMR terminal registration into a SIP register message to result in the SIP proxy server perceiving and managing the DMR terminal as a SIP user agent.

* * * * *